United States Patent [19]

Krasnov

[11] Patent Number: 4,730,806
[45] Date of Patent: Mar. 15, 1988

[54] GATE VALVE

[75] Inventor: Igor Krasnov, Fountain Valley, Calif.

[73] Assignee: Vetco Gray Inc., Houston, Tex.

[21] Appl. No.: 900,224

[22] Filed: Aug. 22, 1986

Related U.S. Application Data

[63] Continuation of Ser. No. 763,728, Aug. 8, 1985, abandoned.

[51] Int. Cl.[4] .................... F16K 3/02; F16K 31/128
[52] U.S. Cl. ............................. 251/62; 92/117 A; 251/63
[58] Field of Search .................. 251/62, 63, 329; 91/216 R; 92/106, 117 R, 117 A; 166/317, 321; 175/218

[56] References Cited

U.S. PATENT DOCUMENTS

| | | | |
|---|---|---|---|
| 1,273,728 | 7/1918 | Burd | 92/117 |
| 2,148,273 | 2/1939 | La Brie | 92/117 |
| 2,568,092 | 9/1951 | Sloan et al. | 92/106 X |
| 3,610,569 | 10/1971 | Reaves | 251/62 |
| 4,010,928 | 3/1977 | Smith | 251/63 X |
| 4,456,217 | 6/1984 | Winegeart et al. | 251/58 |
| 4,492,359 | 1/1985 | Baugh | 92/117 R X |
| 4,647,005 | 3/1987 | Hunter | 251/63 |

FOREIGN PATENT DOCUMENTS

| | | | |
|---|---|---|---|
| 2437512 | 5/1980 | France | 137/580 |
| 0781474 | 11/1980 | U.S.S.R. | 137/580 |

*Primary Examiner*—Martin P. Schwadron
*Assistant Examiner*—Stephen M. Hepperle
*Attorney, Agent, or Firm*—Joseph R. Dwyer

[57] ABSTRACT

A gate valve (10) having a valve operator (40) fully contained within a valve body with means for communicating fluid under pressure to the valve operator (40) to move a gate (32) to a valve open or a valve closed position. The valve operator (40) is located within the gate chamber (30) and the gate (32) itself contains and forms part of the valve operator (40) and, thus, considerable space is conserved. In one embodiment, the means for communicating pressure fluid to the valve operator includes a manifold (16) to allow the valve body (12) to rotate as part of a drilling assembly yet be remotely controllable. In another embodiment, the manifold may be eliminated for the use of the valve does not require rotation.

This invention introduces gate valve technology into drilling operations to displace ball valves as kelly cock valves.

5 Claims, 6 Drawing Figures

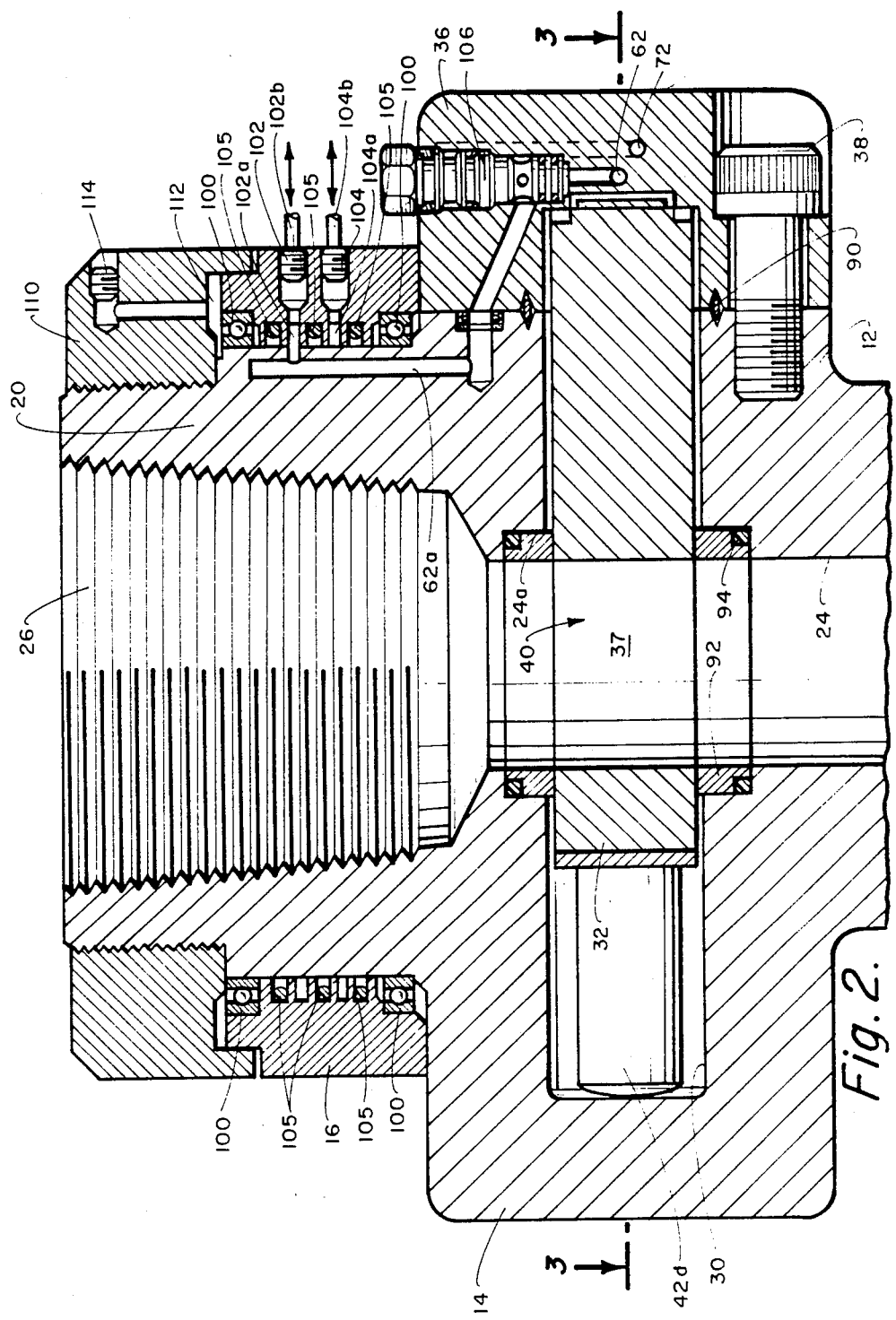

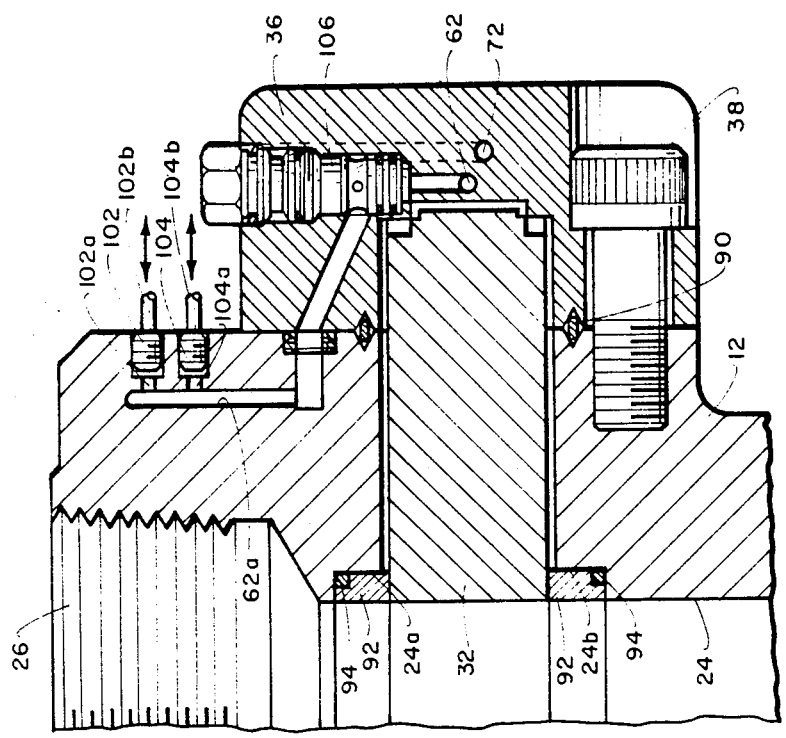
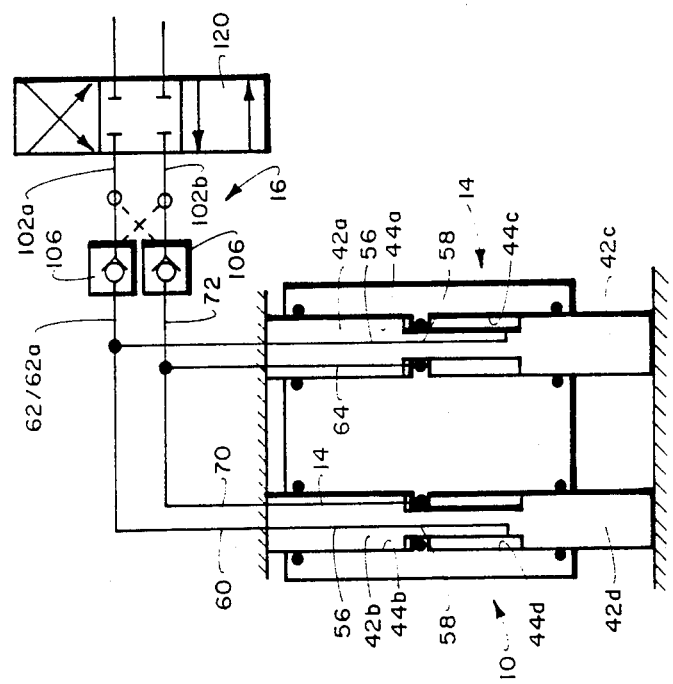

GATE VALVE

This is a continuation, of application Ser. No. 763,728, filed Aug. 8, 1985 now abandoned.

BACKGROUND OF THE INVENTION

This invention relates to valving devices for oil field drilling systems and is particularly directed to an improvement in upper kelly cock valves. More specifically, this invention is related to an improvement in gate valves for use as upper kelly cock valves and will be described as such, however, this invention may also be used in any other application where there is a need for improved gate valves.

A kelly cock valve and its function in drilling operations has been described in a number of U.S. Pat. Nos. for example, in Kellner, U.S. Pat. No. 3,806,082, in Kubelka U.S. Pat. No. 3,887,161, in Winegeart et al U.S. Pat. No. 4,456,217, and in Winegeart U.S. Pat. No. 4,519,576. As pointed out in these patents, as part of the drilling assembly, a rotary swivel is supported by a traveling block in a derrick and is provided with means for conducting drilling fluids therethrough. In operation, the swivel is connected to a kelly cock valve through which the drilling fluids also flow, which, in turn, is connected to a kelly. The kelly extends to the floor of the drilling rig where it is engaged by a rotary table so that rotation may be imparted to the kelly and to the drill string.

The purpose the the kelly cock valve is to close the drilling assembly to the flow of fluid due to the fact that, frequently during drilling operations, a well may blow-out reversing the flow of fluid. Since the kelly cock valve is normally at an elevated position in the drilling rig, closure of the valve required a derrick hand to climb up the drilling rig and manually close the valve. The time delay in closing the valve was such a problem that attempts were made to provide remote or automatic controls on such valves, but such attempts met with only limited success.

One reason for such limited success is that, historically, the kelly cock valves have been ball valves and the attempts to provide ball valves with automatic or remotely operated closing mechanisms are simply add-ons to an existing valve design. Thus, the ball valves, having been designed for manual operation, are difficult to operate remotely or automatically. The add-ons are usually large and cumbersome, subject to frequent breakdown, and generally unreliable. Also, to repair, either the valve itself or the remote/automatic control mechanism, the entire valve assembly has to be removed from the drilling system and, if this occurs during drilling operations, the time lost is quite expensive.

This invention, on the other hand, is intended to replace the ball valve as a kelly cock valve with a gate valve having the following advantages:
- smaller in overall envelope size,
- simpler in design,
- more dependable in service, and
- capable of being disassembled for repair without removal of the entire valve.

Thus, this invention, being a gate valve, is intended as a replacement for existing kelly cock valves of the ball valve type.

SUMMARY OF THE INVENTION

The invention which has the foregoing advantages comprises a gate valve having a valve operator fully contained within a valve body with means for communicating fluid under pressure to the valve operator to move the gate to a valve open or valve closed position. The valve operator is located within the gate chamber and the gate itself contains and forms part of the valve operator and thus the operator does not add to the space required within the valve. In one embodiment, the means for communicating pressure fluid to the valve operator includes a manifold to allow the body to rotate as part of a drilling assembly yet be remotely controllable. In another embodiment, the manifold may be eliminated where the use of the valve does not require rotation.

It will be apparent to those skilled in this art that this invention introduces gate valve technology into drilling operations to displace ball valves as kelly cock valves.

BRIEF DESCRIPTION OF THE DRAWINGS

FIG. 2 is a cross sectional view, enlarged over that of FIG. 1, and taken along the line of 2—2 of FIG. 1 to illustrate the inner details of the valve, FIG. 5 is a schematic of the valve flow lines for communicating fluid to and from the valve operator, and FIG. 6 is a cross sectional view, similar to FIG. 2, but only showing part of the valve body and without the manifold to illustrate a gate valve that may be used where valve body rotation is not a requirement.

DETAILED DESCRIPTION

Figure 1:
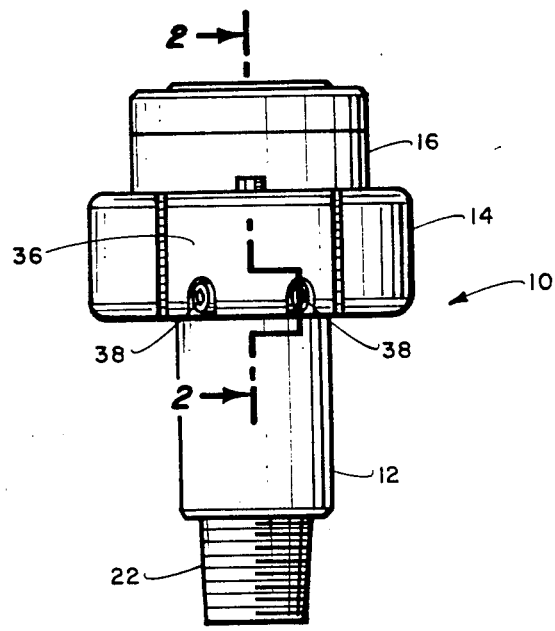
FIG. 1 is an elevational view of the gate valve housing constructed in accordance with the teachings of this invention for use as a kelly cock valve.
Figure 4:
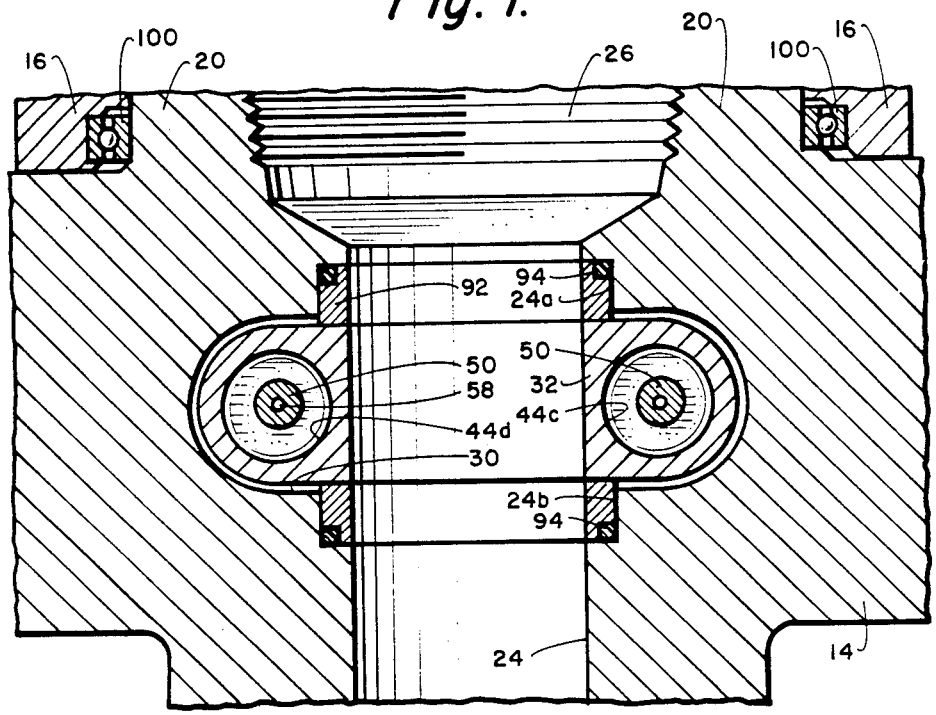
FIG. 4 is a cross sectional view, taken along 4—4 of FIG. 3, to illustrate still more details of the gate valve.

FIG. 1 is an elevational view of the gate valve 10 of this invention in the form of a kelly cock valve and shows a main cylindrical valve body 12 with an enlarged radially extending collar 14 integrally formed as part of the main body and midway thereof, and a manifold 16 encircling on an upper integral cylindrical portion 20 of the main body 12 and shown above the collar in this figure. The main body 12 is adapted to rotate during drilling operations while the manifold remains stationary.

As shown in the FIGS. 1–4, the lower part of valve body 12 is tapered and threaded as at 22 (FIG. 1) and contains an axial main bore 24 which expands into an upper large tapered, threaded bore or mouth 26. The lower tapered threads 22 are typically connected to a drill pipe and the mouth 26 is typically connected to a swivel so that drilling fluids, communicated to the swivel, flow through the valve bore 24 and into bores in a kelly and drill pipe.

Below the mouth 26 and transverse the main bore 24, but within the enlarged collar 14, is a transverse gate cavity 30 containing a slidable gate 32, itself having a central bore 37 corresponding in size to the main bore 24. The gate cavity 30 opens outwardly of the main valve body but is closed by an end cap 36 bolted on to the main valve body by bolts 38. The end cap 36 is contoured to conform to the outer diameter of the collar 14 and appears as a segment of the collar as more clearly shown in FIG. 1. Removal of this end cap 36, opening the gate cavity 30, permits removal of the gate 32 as well as the internal valve operator designated in its entirety as 40 in FIG. 3 for repair and maintenance, an important feature of this valve.

Figure 3:
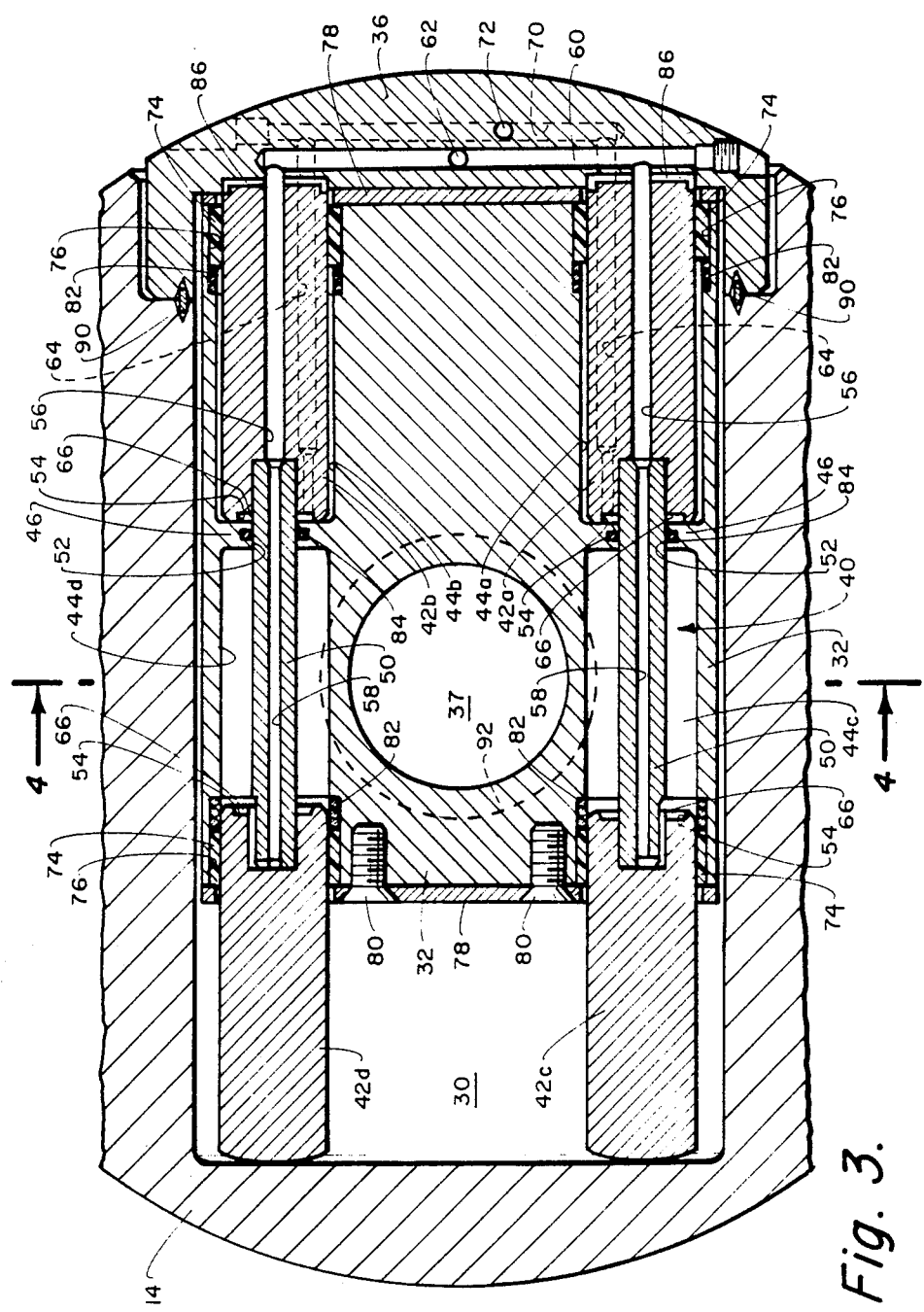
FIG. 3 is a cross sectional view, taken along line 3—3 of FIG. 2, and illustrating the details of the valve operator.

FIG. 3, like FIG. 1, also illustrates the blending of the end cap 36 into the outer contour of the collar.

FIG. 3 shows the valve operator 40 which will now be described. As shown, a plurality of cylindrical stationary pistons (tubular members) 42 a, b, c, and d, are each telescoped within blind bores 44 a, b, c, and d in the gate 32 as part of the means for actuating the gate 32 within the gate cavity. The bores 44 a-d are axially aligned in pairs separated (or forming) a wall 46 between each bore pair.

Between each pair of pistons 42 a/b and 42 c/d is a tube 50 of lesser diameter, each inserted in shorter, smaller counterbores within the pistons 42 a-d to space the pistons from each other. The tubes 50 also extend through openings 52 in the walls 46. Bores 44 a-d, together with the ends 54 of the pistons 42 a-d, define gate actuating chambers (piston chambers) to receive operating hydraulic fluid. (Since the bores 44a-d are also part of the chambers, the identification numerals and names, bores and chambers, will be used interchangeably.)

One of each pair of pistons, i.e., 42a and 42b, is centrally longitudinally bored as at 56 and in open communication with corresponding central axial bores 58 in the smaller tubes 50 to communicate fluid from a suitable pressure source to chambers 44d and 44c. Bore 60 in the end cap 36 is in open communication with bores 56 and with a transverse bore 62 to communicate hydraulic operating fluid to and from the chambers 44c and 44d.

The same pair of pistons, 42a and 42b, are also each provided with a longitudinal bore 64 offset the center line but parallel to axial bores 56 to communicate the fluid to the chambers 44a and 44b. The ends 54 of each of the pistons are provided with passages 66 in open communication with the four chambers 44a-d to permit the flow of operating fluid to and from the chambers as directed.

Like bores 56, a bore 70, shown parallel to bore 60, is also formed in the end cap 36 and in open communication with longitudinal bores 64 and with a transverse bore 72 to communicate fluid to and from the chambers 44a and 44b.

Thus, fluid under pressure entering one pair of chambers, for example, 44c and 44d, while chambers 44a and 44b are vented to a low pressure zone or sump, will move the gate 32 to a valve open position. Conversely, fluid under pressure entering chambers 44a and 44b, while chambers 44c and 44d are vented to a low pressure zone or sump, will move the gate 32 to a valve closed position, i.e., the opening 37 is out of the flow path of the main bore 24.

To complete the description of the gate and valve operator, it can be seen that the chambers 44 a-d are appropriately sealed against leakage by tubular seals 74 held in counterbores 76 in the ends of the bores 44 a-d by end plates 76 on each end of the gate 32. The end plates 78 are removeably fastened to the ends of the gate 32 by any suitable means, such as screws 80, and the seals are spring biased against the end plate by helical springs 82. The openings 52 in the wall 46 to accommodate the small tubes 50 are sealed against leakage by O-ring seals 84. Also, the ends of the pistons 42a and 42d are sealed with respect to the end cap 40 by plate seals 86 and the end cap itself is sealed with respect to the valve body by metal seals 90. Finally, the gate itself is sealed with respect to the main bore 24 by a cylindrical inserts 92 located in cylindrical enlarged bores 24a and sealed with O-ring seals 94.

Again, it can be seen from the above that removal of the end cap 36 will allow removal of the gate 32 and components comprising the valve operator 40.

To communicate operating fluid to and from outside the gate valve 10 to the respective chambers 44a-d, attention is now directed to the stationary manifold 16 and, in particular, FIG. 3 which shows a cross sectional view thereof.

The manifold 16 is a ring stationary with the rotatable valve body and provided with suitable bearings 100 located between the ring and valve body to minimize friction. The ring has two ports 102 and 104 communicating with two concentric internal grooves 102a and 104a for communicating fluid to and from the valve from high and low pressure sources such as available on a drilling rig. The fluid lines to and from the rig are represented at 102b and 104b. The grooves 102a and 104a are sealed against leakage by O-ring seals 105 in grooves located between grooves 102a and 104a. Both grooves 102a and 104a open into passages in the valve body, although only one passage 62a is shown since the other passage is displaced peripherally on the manifold. Both grooves maintain open communication with both passages as the valve body rotates. Passage 62a is identified as such since it is an extension of the passage 62 in the end cap 36 as clearly shown. The other passage would also communicate with passage 72 and both would have an intervening pilot operated one-way valve 106 (again only one shown in passages 62a and 62). The ring is inserted over the tubular portion 20 of the main body and held in place by retainer 110 threaded thereon as at 112. This retainer forms with the ring a grease chamber 112 and contains a grease plug 114.

Turning now to FIG. 5, there is illustrated schematically the passages previously described for communication to and from the valve chambers 44 a-d. In this figure, the numbers corresponding to the identical components previously described are similarly designated to facilitate understanding of the schematic and to simplify the description thereof. Not previously described is a three position flow control valve 120 for directing the flow of fluid from the rig or other source through the various passages and into the gate valve. It is apparent that, depending on the position of the three position control valves 120 and the pilot operated check valves 106, the chambers 44 a/b and 44 c/d can be alternately connected remotely to low and high pressure to open and close the gate valve.

FIG. 6 is a partial view similar to FIG. 2 but illustrating the means of communicating fluid to and from the gate valve in the absence of a manifold. Since the passages and other components are given reference numerals similar to the previously described passages, no further description is necessary herein. It should be pointed out, however, that the valve body in this embodiment need not be of the same as in the previously described embodiment since the manifold is absent, too, and other means than the threaded connection for connecting the valve for a flow of fluid through the main bore may be used.

I claim:

1. A gate valve comprising, a valve body with a main bore therethrough, a gate cavity in said valve body disposed transverse to said main bore, said gate cavity having a closed end and an open end, a reciprocable gate body of essentially uniform cross section throughout its length, insertible only through and removable only through said open end, for closing said main bore in a first position and for opening said main bore in a second position, valve operator means totally within said gate cavity and within said gate body and insertible through and removable only through said open end along with said gate body for reciprocating said gate body in response to fluid pressure, said valve operator means including fluid passageways for the communication of said fluid pressure and piston chambers cooperating with stationary pistons to open and close said main bore in response to said fluid pressure, said piston chambers being formed as bases within said gate body and independent of said valve body, and cap means for removably closing said gate cavity.

2. The valve as claimed in claim 1 wherein said pistons are held stationary while said piston chambers increase and decrease in volume as said gate valve is opened and closed.

3. The valve body as claimed in claim 2 wherein said gate body further includes stationary means located between said pistons within said gate body for communicating fluid to said piston chambers for controlling the movement of said gate body.

4. The valve as claimed in claim 3 including a manifold surrounding a portion of said valve body and having means for communicating pressure fluid to and from said piston chambers.

5. A gate valve comprising:

a valve body;

means defining a main bore therein which includes a valve outlet and inlet for the passage of fluid therethrough;

means defining a gate chamber in said valve body transverse said main bore and closed at one end and open at the other, the closing of said closed end being an integral part of said valve body;

a gate of essentially uniform cross-section throughout its length reciprocable in said gate chamber for opening and closing said main bore to the flow of fluid therethrough and insertible through said open end;

cap means for closing said open end after said gate has been inserted in said gate chamber; and means totally within said gate chamber for reciprocating said gate including, means defining pairs of bores within said gate and separate from said valve body, pairs of stationary pistons in said bores, said pistons with said bores defining pairs of fluid chambers in said gate, the volume of said pairs of fluid chambers being variable depending on the position of said gate, means within said gate for communicating fluid pressure to alternate pairs of fluid chambers through said pistons to thereby reciprocate said gate, said gate, fluid chambers and pistons being such that removal of said gate from said valve body through said opening also removes said fluid chambers and said pistons.

* * * * *